(12) United States Patent
Ye et al.

(10) Patent No.: US 9,077,103 B2
(45) Date of Patent: Jul. 7, 2015

(54) ELECTRICAL CARD CONNECTOR WITH LOCKING PORTION

(71) Applicant: HON HAI PRECISION INDUSTRY CO., LTD., New Taipei (TW)

(72) Inventors: Chun Ye, Wuxi (CN); Fang-Yue Zhu, Kunshan (CN); Jian-Fei Yu, Kunshan (CN); Jin-Kui Hu, Kunshan (CN)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 31 days.

(21) Appl. No.: 13/968,442

(22) Filed: Aug. 16, 2013

(65) Prior Publication Data

US 2014/0065871 A1   Mar. 6, 2014

(30) Foreign Application Priority Data

Aug. 16, 2012   (CN) .................. 2012 2 0406005 U

(51) Int. Cl.
*H01R 13/62*   (2006.01)
*G06K 13/08*   (2006.01)

(52) U.S. Cl.
CPC .............. *H01R 13/62* (2013.01); *G06K 13/085* (2013.01)

(58) Field of Classification Search
CPC .. H01R 23/00; H01R 13/2442; H01R 23/682; H01R 23/7005; H01R 23/7068; G06K 7/0021
USPC .................................. 439/630, 328
See application file for complete search history.

(56) References Cited

U.S. PATENT DOCUMENTS

| | | | |
|---|---|---|---|
| 5,020,999 A * | 6/1991 | Dewitt et al. | 439/328 |
| 6,164,998 A * | 12/2000 | Poi et al. | 439/326 |
| 6,206,710 B1 * | 3/2001 | Chen | 439/159 |
| 6,358,079 B1 * | 3/2002 | Noble | 439/328 |
| 7,887,357 B1 * | 2/2011 | Yang | 439/331 |
| 8,142,229 B1 * | 3/2012 | Bobuk et al. | 439/630 |
| 2006/0094277 A1 * | 5/2006 | Yang et al. | 439/328 |
| 2006/0172605 A1 * | 8/2006 | Chen | 439/630 |
| 2007/0026740 A1 * | 2/2007 | Chen | 439/630 |
| 2007/0249232 A1 * | 10/2007 | Haneishi | 439/630 |
| 2010/0062647 A1 * | 3/2010 | Yang | 439/630 |
| 2013/0309893 A1 * | 11/2013 | Li et al. | 439/328 |

FOREIGN PATENT DOCUMENTS

TW   M381185   5/2010

* cited by examiner

*Primary Examiner* — Gary Paumen
(74) *Attorney, Agent, or Firm* — Wei Te Chung; Ming Chieh Chang

(57) ABSTRACT

An electrical card (100) connector includes an insulative housing (1), a set of contacts (2) received in the housing and a locking portion (17) retained in the housing (1). The housing (1) defines a receiving cavity (10) for receiving an electrical card. The locking portion (17) has an elastic arm (171) connected with the housing (1) and a latching portion (172) extending forwardly from the elastic arm (171) and extending into the receiving cavity (10) to retain the electrical card. The locking portion (17) can deflect along a left to right direction under stress, so the insertion and extraction force of the electrical card insert in and eject out of the receiving cavity (10) moderately, it can not only ensure the electrical card connector (100) lock the electrical card firmly but also ensure the electrical card not be damaged easily.

17 Claims, 4 Drawing Sheets

ELECTRICAL CARD CONNECTOR WITH LOCKING PORTION

BACKGROUND OF THE INVENTION

1. Field of the Invention

The present invention generally relates to an electrical card connector and more particularly to an electrical card connector with a locking portion.

2. Description of Related Art

Electrical cards are known in the art and contain intelligence in the form of a memory circuit or other electronic program. Some form of card readers retrieve the information or data stored on the card. Such cards are used in many applications in today's electronic society, such as video cameras, digital cameras, smart phones, PDAs, music players, ATMs, cable television decoders, toys, games, PC adapters, multi-media cards and other electronic applications, etc.

TW Patent Application Published No. M381185 discloses an electrical card connector used for receiving an electrical card and comprises an insulative housing, a plurality of contacts retained in the insulative housing and a locking portion located on one side of the insulative housing for locking with the electrical card. The locking portion and the insulative housing are integrated. The locking portion is a rigid structure. The locking portion resists the electrical card as a hard interference. When the electrical card inserts in or ejectors out of the electrical connector, the locking potion would be damaged easily.

So, an improved connector is needed.

SUMMARY OF THE INVENTION

The present invention provides an electrical card connector used for connecting with an electrical card. The electrical card connector comprises an insulative housing, a plurality of contacts retained in the insulative housing and a locking portion located on one side of the insulative housing. The insulative housing has a receiving cavity for receiving the electrical card. The locking portion has an elastic arm connecting with the insulative housing and a latching portion extending forwardly from the elastic arm, the latching portion extends into the receiving cavity to retain the electrical card, the locking portion can deflect along a left to right direction under stress.

Other objects, advantages and novel features of the present invention will become more apparent from the following detailed description of the present embodiment when taken in conjunction with the accompanying drawings.

DETAILED DESCRIPTION OF THE INVENTION

Figure 1:
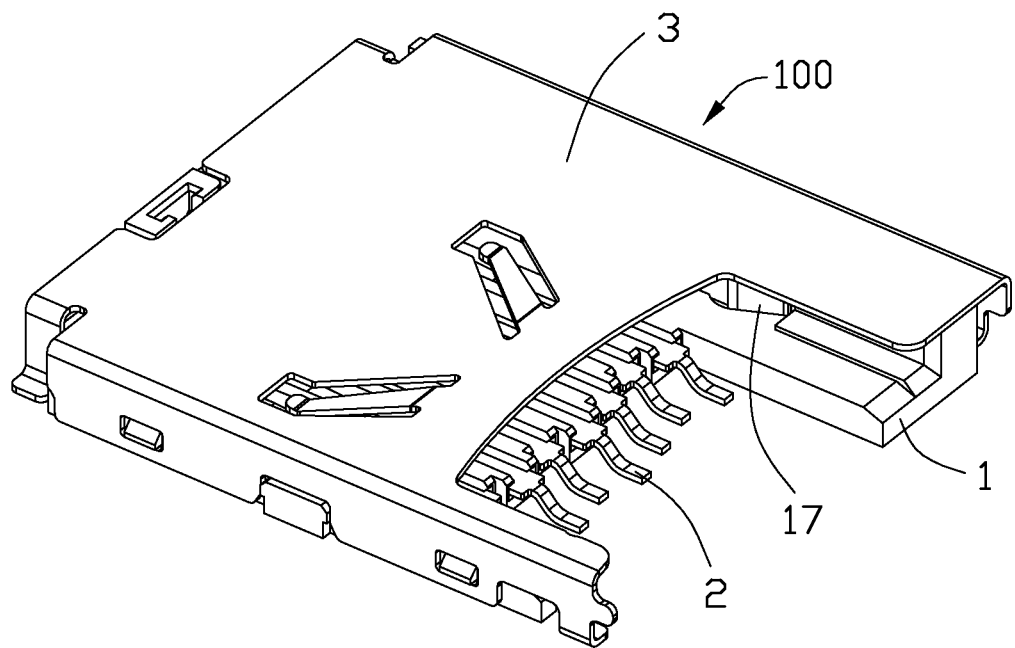
FIG. 1 is an assembled perspective view of an electrical card connector according to a preferred embodiment of the present invention.
Figure 2:
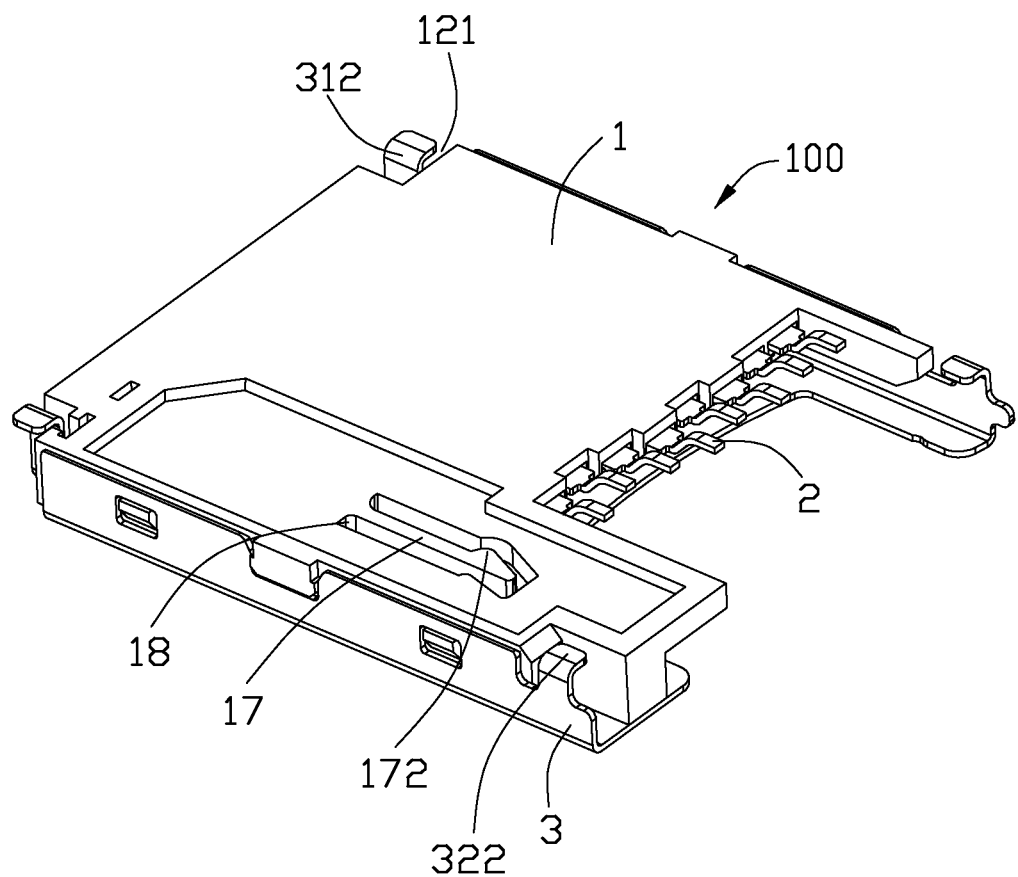
FIG. 2 is another assembled perspective view of the electrical card connector as shown in FIG. 1, taken from a rear side.
Figure 3:
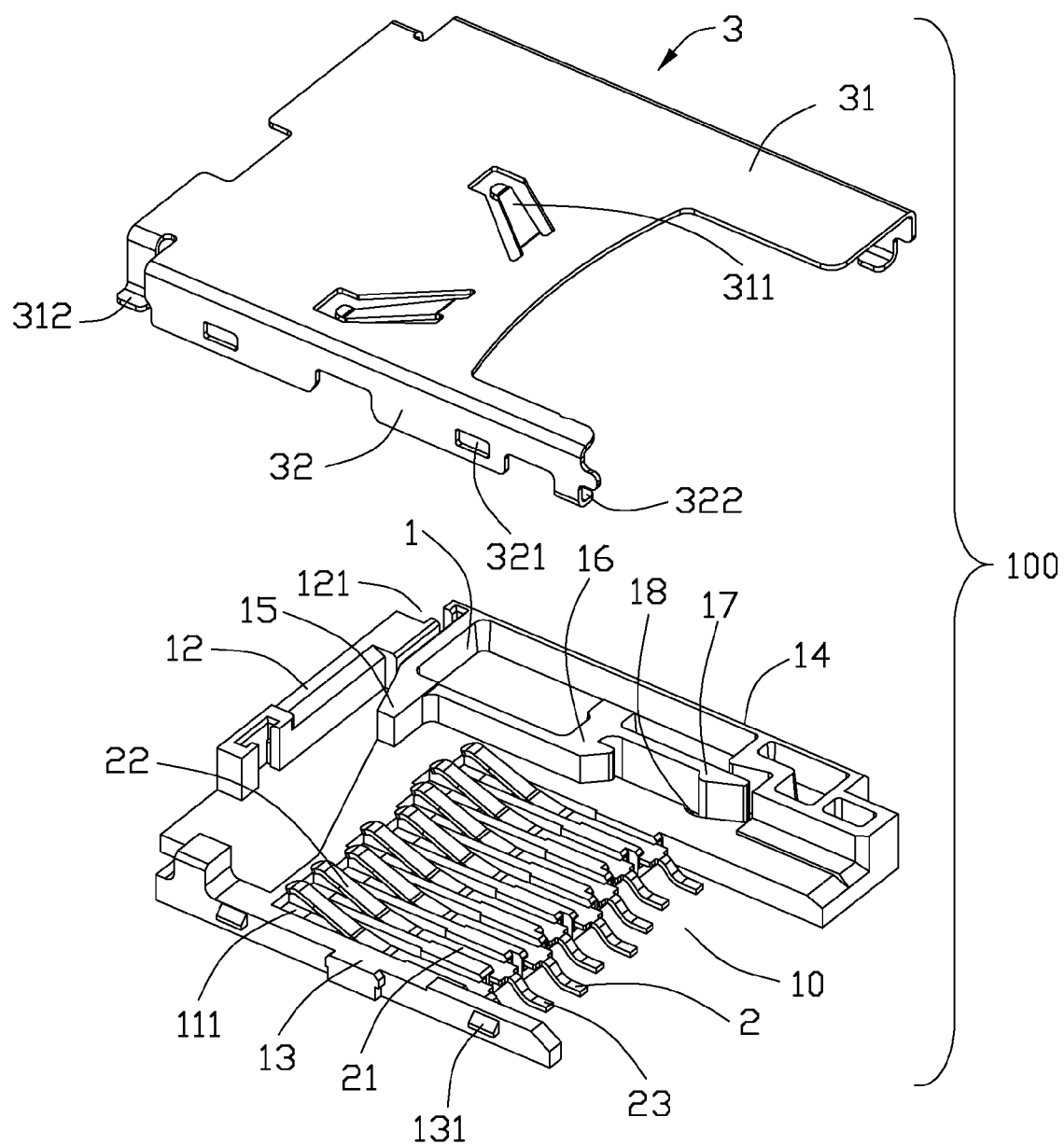
FIG. 3 is an partially exploded view of the electrical card connector according to a preferred embodiment of the present invention.
Figure 4:
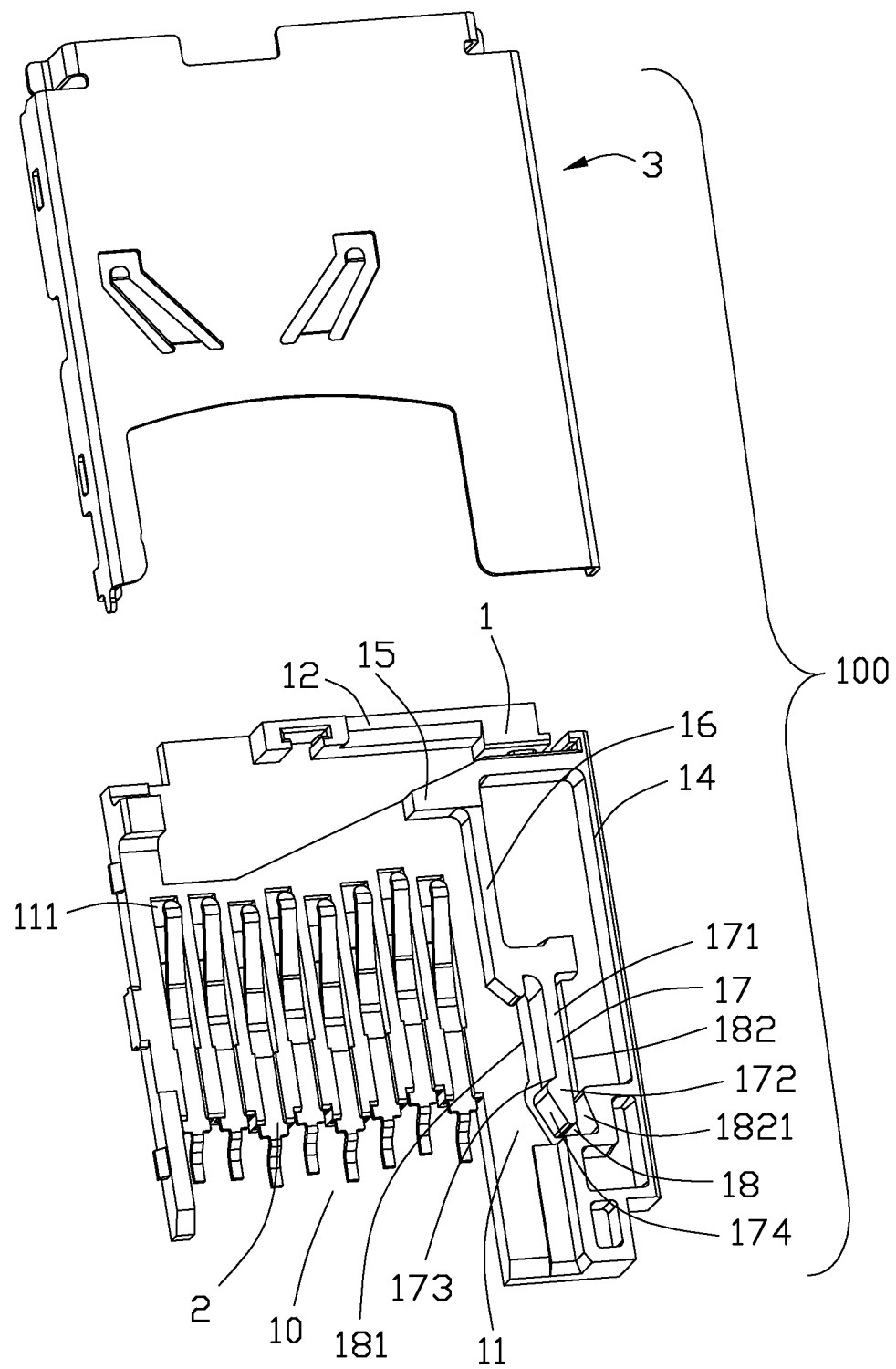
FIG. 4 is similar with FIG. 3, but taken from another side.

Reference will now be made to the drawing figures to describe the preferred embodiment of the present invention in detail.

Referring to FIG. 1, an electrical connector 100 comprises an insulative housing 1, a plurality of contacts received in the insulative housing 1 and a shield shell 3 covering the insulative housing 1.

Referring to FIGS. 1-4, the insulative housing 1 includes a receiving cavity 10 for receiving an electrical card (not shown), a bottom wall 11 under the receiving cavity 10, a rear wall 12 behind the receiving cavity 10 and a first and a second side walls 13, 14 located a right and a left sides of the receiving cavity 10. The insulative housing 1 further includes a resisting portion 15 extending toward left side from a rear of the second side wall 14, a connecting portion 16 extending forwardly from a middle of the resisting portion 15, a locking portion 17 extending forwardly from the connecting portion 16 and an escaping cavity 18 surrounding around the locking portion 17. The receiving cavity 10 is surrounded by the bottom wall 11, the resisting portion 15, the first side wall 13, the connecting portion 16 and the locking portion 17. Two notches 121 pass through the insulative housing 1 along an upper to down direction and are located two sides of a rear of the insulative housing 1. The notches 121 pass through the insulative housing 1 backwardly and outwardly. The bottom wall 11 includes a plurality of receiving slots 111 depressed downwardly thereof and separated from each other. The first and second side walls 13, 14 each have a plurality of retaining blocks 131 extending outwardly and beyond the shield shell 3.

The locking portion 17 and the insulative housing 1 are integrated. The locking portion 17 includes an elastic arm 171 extending forwardly from the connecting portion 16 and a latching portion or latching head 172 extending into the receiving cavity 10 from a front end of the elastic arm 171. The latching portion 172 includes a first resisting surface 173 extending left and aslant from the front end of the elastic arm 171 and a second resisting surface 174 extending right and aslant from a front of the first resisting surface 173. The first and the second resisting arms 173, 174 are formed an obtuse angle. As right outline of the locking portion 17 is a vertical surface which extends forwardly.

The escaping cavity 18 passes through the bottom wall 11 of the insulative housing 1 along the upper to down direction. The escaping cavity 18 includes a first inside surface 181 located in the left side, a second inside surface 182 located in the right side and a third inside surface (not labeled) located in a front thereof. An outline of the first inside surface 182 is same as that of the left side of the locking portion 17. A part of the second inside surface 182 which is opposite to the elastic arm 171 of the locking portion 17 is a vertical surface extending along a front to rear direction. The other part of the second inside surface 182 which is opposite to the latching portion 172 of the locking portion 17 is a vertical face 1821 extending outwardly and aslant. When the latching portion 172 deflects toward a right direction, the latching portion 172 resists the vertical face 1821. A bottom surface of the locking portion 17 and a bottom surface of the bottom wall 11 are in a same surface. The locking portion 17 extends upwardly beyond an upper surface of the bottom wall 11. The locking portion 17 is located in the escaping cavity 18 and defined a gap between the first, second and third inside surface 181, 182 to make the locking portion 17 deflectable in the escaping cavity 18 along the left to right direction. The locking portion 17 located in the escaping cavity 18 can resist the first and second inside surface 181, 182 of the escaping cavity 18 to prevent the elastic arm 171 from overly defecting along the left to right direction. The latching portion 172 extends into the receiving cavity 10 to resist a recess of the electrical card (not shown) for locking with the electrical card.

The contact 2 includes a retaining portion 21 retained in the receiving slot 111, a contacting portion 22 extending backwardly into the receiving cavity 10 from the retaining portion 21 and a soldering portion 23 extending forwardly and out of the insulative housing 1 from the retaining portion 21.

The shield shell 3 is made by a metal plate and includes a top wall 31 and two side walls 32 extending downwardly from two side of the top wall 31. The top wall 31 has an elastic plate 311 extending downwardly into the receiving cavity 10 therefrom and two first mounting portions 312. The elastic plate 311 abuts against the electrical card. The first mounting portions 312 extend downwardly from a rear of the two sides of the top wall 31 firstly and then extend outwardly and horizontally. The first mounting portions 312 extend not beyond vertical surfaces of the two side walls 32. The side walls 32 each include a plurality of locking slots 321 locking with the retaining blocks 131 of the insulative housing 1 and two second mounting portions 322 extending inwardly and horizontally from a front of the insulative housing 1.

The electrical card connector 100 is assembled easily and quickly, just retaining the contacts 2 to the insulative housing 1 and then putting the shield shell 3 covering upon the insulative housing 1. The locking slots 321 of the shield shell 3 lock with the retaining block 131 of the insulative housing 1 for assembling the shield shell 3 to the insulative housing 1. The first mounting portion 312 of the shield shell 3 is received in the notched 121 of the insulative housing 1 and the second mounting portions 322 extend inwardly. It can reduce a space of the PCB (not shown) when the electrical connector 100 is mounted into the PCB.

When the electrical card (not shown) inserts into the receiving cavity 10, a right edge of the electrical card (not shown) rightly abuts against the latching portion 172 of the locking portion 17. The electrical card (not shown) can insert successfully. The insulative housing 1 has the escaping cavity 18 offering a space to allow the locking portion 17 deflecting therein. The second inside surface 182 of the escaping cavity 18 which is opposite to the latching portion 172 of the locking portion 17 is a vertical face 1821. When the latching portion 172 deflects rightly and abuts against the second inside surface 182 as a surface to prevent the latching portion 172 from fracturing under overly extraction force. When the electrical card (not shown) is inserted, the latching portion 172 deflects back and inserts into the recess of the electrical card. A front edge of the recess is combined with the first resisting surface 173 of the latching portion 172 to prevent the electrical card from moving forwardly. When the electrical card is withdrawn, a right edge of the electrical card abuts against the latching portion 172 of the locking portion 17 to make the latching portion 172 deflects rightly and leaves the recess of the electrical card. The elastic arm 171 is located between the connecting portion 16 and the latching portion 172, and the locking portion 17 can deflects in the escaping cavity 18 along the left to right direction. It would reduce the extraction force of the electrical card which drew out of the electrical card connector 100. Technically speaking, the locking portion 170 essentially includes a first section, i.e., the upper half, which is located above the bottom wall 11 and beside the receiving cavity 10 for locking the inserted card, and a second section, i.e., the lower half, which is locate within the escaping cavity 18 for protectively deflectable therein.

The electrical card connector 100 has the escaping cavity 18 surrounding around the locking portion 17 and passing through the insulative housing 1 along the upper to down direction. When the electrical card insets into or withdrawn from the electrical connector 100, the locking portion 17 can deflect along the left to right direction in the escaping cavity 18. The extraction force of the electrical card insert in and ejector out of the receiving cavity 10 moderately. It can not only ensure the electrical card connector 100 lock the electrical card firmly but also ensure the electrical card not be damaged easily.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector comprising:
    an insulative housing having a receiving cavity for receiving an electrical card;
    a plurality of contacts retained in the insulative housing; and
    an insulative locking portion integrally formed with the insulative housing via an injection molding procedure and located in one side of the insulative housing, the locking portion including an elastic arm connecting with the insulative housing and a latching portion extending forwardly from the elastic arm, the latching portion extending into the receiving cavity for retaining the electrical card, the locking portion being deflectable along a left to right direction,
    wherein the insulative housing has an escaping cavity around the locking portion to offer a escaping space when the locking portion deflects, and the escaping cavity includes a first inside surface and a second inside surface, a gap is defined between the first and second inside surfaces to make the locking portion deflect along the left to right direction, and the shape of the first inside surface is same as a outline of a left side of the locking portion.

2. The electrical card connector as claimed in claim 1, wherein the outline of a right side of the locking portion is a vertical surface which extends forwardly, a part of the second inside surface opposite to the elastic arm is a vertical surface extending along a front to rear direction, another part of the second inside surface opposited to the latching portion is a vertical face extending outwardly and aslant.

3. The electrical card connector as claimed in claim 1, wherein the insulative housing has a bottom wall located under the receiving cavity, the escaping cavity passes through the bottom wall along an upper to down direction, a bottom surface of the locking portion is at a same surface with a bottom surface of the bottom wall, the locking portion extends upwardly beyond an upper surface of the bottom wall.

4. The electrical card connector as claimed in claim 3, wherein the insulative housing has a first side wall located in a left side thereof, a second side wall located in a right side thereof, a resisting portion extending inwardly and forwardly from a rear of the second side wall and a connecting portion extending forwardly from a middle of the resisting portion, the locking portion extends forwardly and horizontally from the connecting portion, the resisting portion is located in the rear of the receiving cavity for prevent the electrical card from overly insertion.

5. The electrical card connector as claimed in claim 4, wherein the receiving cavity is surrounded by the bottom wall, the first side wall, the resisting portion, the connecting portion and the locking portion.

6. The electrical card connector as claimed in claim 1, wherein the latching portion has a first resisting surface extending left and aslant from the elastic arm, and a second resisting surface extending right and aslant from the first resisting surface, the first and second resisting surface are formed a obtuse angle.

7. The electrical card connector as claimed in claim 1, wherein the insulative housing has two notches located in two sides thereof and passing therethrough along an upper to down direction, the notches pass through the insulative housing outwardly and backwardly.

8. The electrical card connector as claimed in claim 7, further comprises a shield shell covering the insulative housing, the shell has a top wall and two side walls extending downwardly from two sides of the top wall, the top wall has two first mounting portions extending downwardly from a rear thereof firstly and then extending outwardly and horizontally, the first mounting portions are received in the notches of the insulative housing.

9. An electrical card connector used for receiving an electrical card, comprising:
 an insulative housing having a receiving cavity and an escaping cavity recessed along an upper to down direction and besides the receiving cavity;
 a plurality of contacts retained in the insulative housing;
 a locking portion located in the escaping cavity and integrally connecting with the insulative housing, the locking portion having an elastic arm and a latching portion extending into the receiving cavity for retaining the electrical card, when the electrical card is inserted in or ejected out of the receiving cavity, the locking portion deflecting along a left to right direction in the escaping cavity, wherein the escaping cavity comprises a first inside surface on a left of the locking portion and a second inside surface on a right of the locking portion, the two inside surfaces limit a deflecting scope of the locking portion along the left to right direction.

10. The electrical connector as claimed in claim 9, wherein the outline of a right side of the locking portion is a vertical surface which extends forwardly, the shape of the first inside surface is same as a outline of a left side of the locking portion, a part of the second inside surface opposite to the elastic arm is a vertical surface extending along a front to rear direction, another part of the second inside surface opposite to the latching portion is a vertical face extending outwardly and aslant.

11. The electrical connector as claimed in claim 9, wherein the insulative housing has a bottom wall located under the receiving cavity, the escaping cavity passes through the bottom wall along an upper to down direction, a bottom surface of the locking portion is at a same surface with a bottom surface of the bottom wall, the locking portion extends upwardly beyond an upper surface of the bottom wall.

12. The electrical connector as claimed in claim 9, wherein the locking portion and the insulative housing are integrated.

13. An electronic card connector comprising:
 an insulative housing defining a bottom wall above which a card receiving cavity is located for receiving an electronic card in a front-to-back direction, and in which an escaping cavity is formed;
 a plurality of contacts disposed in the housing with contacting sections extending into the card receiving cavity in a vertical direction perpendicular to said front-to-back direction; and
 an insulative locking portion unitarily formed with the housing via an injection molding process and having a first section located above the bottom wall and beside the card receiving cavity in a transverse direction perpendicular to both said front-to-back direction and said vertical direction, said first section essentially aligned with and further downwardly extending into the escaping cavity in said vertical direction while being deflectable in the transverse direction; wherein
 said first section includes a cantilevered elastic arm with one end rooted with the housing and another end equipped with a latching head; wherein
 an region defined by the escaping cavity, viewed in the vertical direction, is not less than that defined by the first section for molding consideration.

14. The electronic card connector as claimed in claim 13, wherein the locking portion further defines a second section located within the escaping cavity, and region defined by the escaping cavity, viewed in the vertical direction, is larger than that defined by the second section so as to allow said second section to be deflectable within the escaping cavity in the transverse direction.

15. The electronic card connector as claimed in claim 14, wherein a bottom face of the second section is coplanar with an undersurface of the bottom wall.

16. The electronic card connector as claimed in claim 13, wherein a contour of escaping cavity is similar to that of the locking portion, viewed in the vertical direction.

17. The electronic card connector as claimed in claim 13, further including a metallic shell to cover the card receiving cavity in the vertical direction, wherein said shell covers the locking portion in the vertical direction.

* * * * *